May 19, 1964   A. M. BISHAY   3,134,019
RADIATION DETECTING WITH SHUTTER GLASS
Filed Aug. 17, 1962
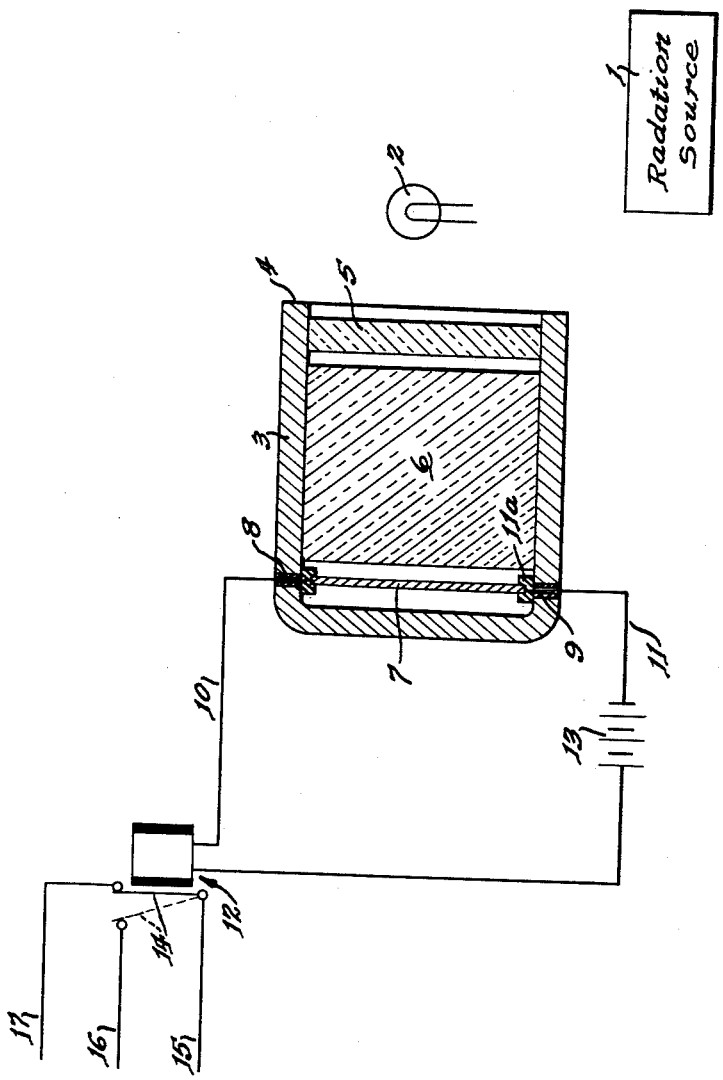
INVENTOR.
Adli M. Bishay
BY
Roland G. Anderson
Attorney

3,134,019
RADIATION DETECTING WITH SHUTTER GLASS
Adli M. Bishay, Cairo, Egypt, assignor to the United States of America as represented by the United States Atomic Energy Commission
Filed Aug. 17, 1962, Ser. No. 218,238
2 Claims. (Cl. 250—83)

The invention relates to a method of detecting high energy radiation, to an apparatus for carrying out the said method, and to a novel glass composition useful in said method and apparatus.

Numerous methods are known for sensing and monitoring the various types of high energy photon radiation such as gamma rays, X-rays, and ultraviolet light, but all have features limiting their usefulness in certain applications. Some methods require intricate electrical devices which are not only easily damaged, but too expensive to use in many situations; other methods depend on organic compounds and sensitized emulsions which are subject to deterioration.

It is accordingly the general object of the invention to provide a cheap, rugged method of sensing or monitoring gamma rays, X-rays, and ultraviolet radiation.

It is a further object to provide such a method which does not depend on organic substances subject to deterioration.

It is a more particular object to provide an economical device for the detection or monitoring of gamma radiation, which may be placed in an unattended location and requires a minimum of maintenance.

Other objects will appear as the description proceeds.

The foregoing objects are attained by my discovery that if to a base glass, preferably a base glass of the potassium-aluminoborate type, a cerium additive is introduced within the range of from about 0.5 to about 5.0 mol. percent (m/o), substantially all in cerous form, the resulting glass becomes what I have named "shutter glass," because of its unique properties under radiation. When exposed to any kind of high energy photon radiation, gamma rays, X-rays, or even ultraviolet radiation, my shutter glass quickly discolors to a bluish shade, the depth of the shade depending on the amount of radiation, and on cessation of the radiation the glass loses its coloration. This discoloration is due to the absorption in the red region of the spectrum, particularly at wave lengths of about 650 to about 730 millimicrons, or equivalently, at about 1.9 to about 1.7 electron volts; and there is strong reason to believe that the same explanation holds good for every type of photon radiation.

The single figure of the drawing is a schematic view of a preferred sensing device according to the invention.

The numeral 1 designates a radiation source to be monitored, which may be a source intentionally located adjacent the sensing device, or a source, the existence of which is to be determined by the device, such as when the device is intended to detect the accidental escape of radiation from a nuclear reactor, or an atomic explosion.

The numeral 2 is a light source which is placed sufficiently close to the open end of the sensing device to insure an adequate supply of light for its operation, as will now be explained. 3 is the main housing, or shell of the device proper, which may be metal, plastic, or other material opaque to visible light. Within outer edge 4 of shell 3 is a plate of appropriate filter glass 5, which filters out substantially all light from the light source 2 except the light in the red region of the spectrum, particularly in the vicinity of the 650 m$\mu$ to 750 m$\mu$ wave lengths above mentioned. Immediately behind the filter plate 5 is a block 6 of my shutter glass, and immediately behind the latter is an element 7 of a material the electrical conductivity of which is influenced by exposure to light, in this case selenium which shows an increase in conductivity under light.

Entering the shell 3 through insulating seals 8 and 9 are wires 10 and 11 which are in electrical contact with the selenium element 7 which is held in place by insulating spacer 11a. Wires 10 and 11 lead to an electrical circuit comprising a relay shown generally schematically at 12, and a battery 13. The relay 12 has a movable arm 14, and lead-in wires from the outer circuit 15, 16, and 17.

The operation of the monitoring device is as follows: when no radiation emanates from the radiation source 1, light from the light source 2 is filtered by the filter glass plate 5 to make a red light which passes freely through the shutter glass block 6 and falls upon the selenium disk 7. Since the selenium element is photoconductive, the light reduces its electrical resistance so that sufficient current from the battery 13 flows through the disk and the rest of the electrical circuit to cause the relay 12 to remain in its closed position shown by the solid line, whereby current from lead-in wire 15 of the external circuit of the relay 12 passes through wire 17.

When radiation emanates from the source 1 the shutter glass block 6 discolors to the blue shade mentioned, and absorbs the red light passing through the filter glass plate 5, thereby shutting off, or at least substantially diminishing the light falling upon the selenium element 7. Thereupon the electrical resistance across element 7 increases so that a diminished current flows between wires 10 and 11, whereupon the arm 14 of the relay 12 falls by gravity to its open position indicated by the dashed line. In this event, current flowing in the external circuit from wire 15, will leave the relay through wire 16, rather than through wire 17. Appropriate alternate circuits (not shown) between wires 15, 16, and 17 may then be provided to activate whatever reading, recording, warning or other devices that are necessary to carry out the purpose for which the monitoring system is intended.

Numerous alternatives may be substituted for features of the system just described. Instead of the selenium element 7, other photoconductive substances such as doped silicon, doped germanium and the like may be used. Instead of a photoconductive element such as the disk 7, a self-generating, or photovoltaic element may be used to generate its own voltage, in which case the battery 13 may be dispensed with. Photoelectric cells of the alkali metal anode type may also be used.

The cerium additive above mentioned imparts the shutter glass properties described to many different base glasses. However, as previously indicated, better results are found with glasses of the potassium aluminoborate type. I have found best results with a base glass of the following composition in molar ratio: 1.0 $Al_2O_3$, 2.5 $B_2O_3$ and 1.5 $K_2O$. To this the cerium additive should be within the range of from about 0.5 to about 5.0 m/o $Ce^{3+}$, depending on the sensitivity to radiation desired. Likewise the thickness of the shutter glass block 6 may be varied, in order to adjust the magnitude of the radiation being monitored to the sensitivity of the element 7.

In making the shutter glass of the invention, it is essential that it be melted under strongly reducing conditions in order to insure that the cerium be in the form of cerous ions, rather than in a higher valence state. Therefore the atmosphere of the melting vessel should be reducing, or otherwise the glass can be melted in an inert gas such as argon, if the glassmaking ingredients be of the reducing type. Hence to make a shutter glass using my preferred potassium-aluminoborate base glass above mentioned, I preferably introduce the borate component into the glass batch in the form of ammonium pentaborate and the cerium in the form of cerous oxalate. Both these are strong reducing agents which tend to impart to the melt a reducing character. Additional reducing agents such as ammonium tartrate may be added to the batch if necessary. $Al_2O_3$ is introduced as hydrated alumina, and $K_2O$ as potassium carbonate. The ingredients are preferably blended and sintered together in order to insure uniformity, and then melted for three hours at about 1350° C., after which the resulting shutter glass is cast into shapes and annealed at about 500° C. for a period of time depending on the size and conformation of the shapes. For specimens in the shape of disks 1 inch thick and ¾ inch in diameter 16 hours is sufficient annealing time. On cooling, the specimens are ground and polished in the usual way.

Tests made with my shutter glasses show a marked absorption of light at about the 700 millimicron wave length following any kind of high energy photon radiation including radiation by gamma rays, X-rays, or even ultra-violet, which absorption rapidly dissipates once radiation has ceased. These tests will be explained more fully in the following specific examples.

The filter glass, such as the plate 5 above mentioned, is preferably a glass having a cerium content in which the cerium is in both the plus three and plus four state. Such a glass is described in the August 1962 issue of The Journal of the American Ceramic Society in an article entitled "Role of Cerium in Suppression of Gamma-Ray Induced Coloring of Borate Glasses" by Adli M. Bishay.

EXAMPLE I 83.78 grams of ammonium pentaborate, 44.48 grams of hydrated alumina, 63.8 grams of potassium carbonate, 7.92 grams of cerous oxalate and 0.60 grams of ammonium tartrate were blended in a rotary blender and the resulting mixture was sintered at 500° C. for two hours in a 100 ml. Pt-Rh crucible in a tungsten-heated controlled-atmosphere furnace under an atmosphere of argon. The temperature of the furnace was then raised to 1350° C. and maintained at that temperature for 3 hours. The resulting glass melt was then cast into disks ¾ inch in diameter and 1 inch thick and annealed at 500° C. for 16 hours. The disks were ground and polished.

The disks were placed in a radiation field from a $Co^{60}$ source of $1 \times 10^5$ roentgens ($r$) per hour. From time to time individual disks were removed from the field and immediately tested for light absorption, or change in optical density in a Cary spectrophotometer. It was found that the disks showed a pronounced absorption of light at 730 m$\mu$ wave length; after a gamma irradiation of $5 \times 10^4$ roentgens the change in optical density at this wave length was 2.5 per inch. An increase in optical density of 2.5 is equivalent to a 99.99% decrease in transmittance. Optical density is the log of $I_o/I_t$ where $I_o$ is the incident light and $I_t$ is the transmitted light.

EXAMPLE II

Five batches of shutter glass were made up according to the procedure of Example I using a barium alumino-borate base glass having the molar ratio of 1.0 $Al_2O_3$, 2.5 $B_2O_3$, and 1.5 BaO. To this base glass was added cerous oxalate in increasing amounts giving a concentration of cerous ions ranging from 0.5 to 5 m/o of $Ce^{3+}$.

A disk from each batch was given $2.5 \times 10^5$ roentgens of gamma radiation and the change in optical density per inch at 650 m$\mu$ determined as in Example I. The results are set forth in the following Table I in which change in optical density per inch is listed opposite mol. percent of $Ce^{3+}$ of the disk in question:

Table I

| Mol. percent $Ce^{3+}$: | Change in optical density (inch$^{-1}$) at 650 m$\mu$ |
|---|---|
| 0.5 | 0.34 |
| 1.0 | 0.34 |
| 2.5 | 0.44 |
| 3.0 | 0.45 |
| 5.0 | 0.53 |

EXAMPLE III

Two batches of shutter glass were made of the same base glass composition as the potassium aluminoborate glass of Example I; the first batch had 0.5 m/o $Ce^{+3}$ and the second 1.5 m/o. Specimens of glass made from each batch were irradiated by a $Co^{60}$ source to a dose of $5 \times 10^4 r$. The glass which had the 0.5 m/o $Ce^{+3}$ content had a change in optical density at 730 m$\mu$ due to irradiation of 0.1 and the other glass a like change of 2.5. Equivalently, the first glass had a change in transmittance of 80%, as compared to 0.01% for the second glass. Hence it can be seen that increasing the $Ce^{+3}$ content from 0.5 m/o to 1.5 m/o brought about an eight-thousandfold reduction of transmittance at 730 m$\mu$. This is obviously far more pronounced than the reduction shown in Example II for the barium aluminoborate glass.

It will be understood that this invention is not to be limited to the details given herein, but that it may be modified within the scope of the appended claims.

What is claimed is:

1. A sensing device for high energy photon radiation comprising a source of light in the red region of the spectrum, a photosensitive element made of a material whose electrical properties are affected by exposure to light in the said region, a shutter glass element containing from about 0.5 to about 5.0 mol. percent of cerium in cerous form, the said shutter glass element being so placed intermediate the light source and photosensitive element that the only light accessible to the photosensitive element passes through the shutter glass element, and electrical circuit means associated with the photosensitive element whereby variations in the light passing through the shutter glass element and falling upon the photosensitive element are transduced into an electrical signal.

2. A sensing device for high energy photon radiation comprising a light source, a housing opaque to light leaving and open end confronting the light source, the light filter plate occupying the entire said open end of the housing and transmitting only light adjacent the wave length of about 650 to about 730 millimicrons, a shutter glass block having a cerium content in cerous form of from about 0.5 to about 5.0 mol. percent, the said block being immediately behind the light filter plate within the housing, a selenium disk immediately behind the shutter glass block within the housing, electrical conductors in contact with the selenium disk at approximately opposite points on its circumference, a biasing battery having one pole in electrical connection with one of the electrical conductors, an electrical relay having one pole in electrical connection with the other of the electrical conductors, and a third electrical conductor between the other pole of the battery and the other pole of the relay.

References Cited in the file of this patent

UNITED STATES PATENTS

| 2,532,386 | Armistead | Dec. 5, 1950 |
| 2,569,793 | Anderson | Oct. 2, 1951 |
| 3,032,428 | Ginther | May 1, 1962 |
| 3,052,637 | Bishay | Sept. 4, 1962 |